(12) United States Patent
Zhao

(10) Patent No.: US 10,598,972 B2
(45) Date of Patent: Mar. 24, 2020

(54) LIQUID CRYSTAL PANEL PROTECTIVE COVER AND LIQUID CRYSTAL PANEL PACKAGING COMPONENT

(71) Applicant: HUIZHOU CHINA STAR OPTOELECTRONICS TECHNOLOGY CO.,LTD., Huizhou Guangdong (CN)

(72) Inventor: Zhilin Zhao, Huizhou Guangdong (CN)

(73) Assignee: HUIZHOU CHINA STAR OPTOELECTRONICS TECHNOLOGY CO., LTD., Huizhou (CN)

(*) Notice: Subject to any disclaimer, the term of this patent is extended or adjusted under 35 U.S.C. 154(b) by 140 days.

(21) Appl. No.: 15/754,579

(22) PCT Filed: Jan. 25, 2018

(86) PCT No.: PCT/CN2018/074206
§ 371 (c)(1),
(2) Date: Feb. 22, 2018

(87) PCT Pub. No.: WO2019/127804
PCT Pub. Date: Jul. 4, 2019

(65) Prior Publication Data
US 2019/0196246 A1 Jun. 27, 2019

(30) Foreign Application Priority Data
Dec. 25, 2017 (CN) .......................... 2017 1 1421478

(51) Int. Cl.
*G02F 1/1333* (2006.01)
*G02F 1/1335* (2006.01)
*B65D 5/50* (2006.01)

(52) U.S. Cl.
CPC .. *G02F 1/133308* (2013.01); *G02F 1/133608* (2013.01); *B65D 5/509* (2013.01); *G02F 2201/46* (2013.01); *G02F 2201/50* (2013.01)

(58) Field of Classification Search
CPC ............. G02F 1/33308; G02F 2201/46; G02F 2201/50; G02F 1/133608
See application file for complete search history.

(56) References Cited

U.S. PATENT DOCUMENTS

| 1,588,121 | A | 6/1926 | Markert |
| 4,011,632 | A | 3/1977 | MacDonald |
(Continued)

FOREIGN PATENT DOCUMENTS

| CN | 2478961 | 2/2002 |
| CN | 202624919 | 12/2012 |
(Continued)

*Primary Examiner* — Dung T Nguyen
(74) *Attorney, Agent, or Firm* — Hemisphere Law, PLLC; Zhigang Ma

(57) ABSTRACT

The present disclosure discloses a liquid crystal panel protective cover includes a cover body and a plurality of protectors. A plurality of limiting portions are provided on the edge of the cover body, the plurality of protectors are respectively fixed in the plurality of limiting portions, the protectors are for abutting a packing tape strapped to the cover body. The disclosure also discloses a liquid crystal panel packaging component, which includes a pallet, a box body and a liquid crystal panel protective cover body, the box is disposed on the pallet, and the liquid crystal panel protective cover body covers the opening of the box. According to the liquid crystal panel protective cover body and the liquid crystal panel packaging component described above, the plurality of protectors are provided on the edge of the cover to prevent the packing tape from sliding on the cover body to prevent the packing tape from damaging the cover.

14 Claims, 3 Drawing Sheets

(56) References Cited

U.S. PATENT DOCUMENTS

| | | | |
|---|---|---|---|
| 4,765,479 A | | 8/1988 | Roberts |
| 2006/0028594 A1* | | 2/2006 | Chou ................ G02F 1/133308 349/58 |
| 2016/0054613 A1* | | 2/2016 | Lee .................. G02F 1/133308 362/97.2 |
| 2016/0313500 A1* | | 10/2016 | Wu ...................... G02B 6/0088 |
| 2017/0003568 A1* | | 1/2017 | Nishi .................. G02F 1/13454 |

FOREIGN PATENT DOCUMENTS

| | | |
|---|---|---|
| CN | 203753619 U | 8/2014 |
| CN | 203767277 U | 8/2014 |
| CN | 205221402 U | 5/2016 |
| DE | 102010018651 | 11/2011 |
| GB | 2291850 | 2/1996 |

\* cited by examiner

LIQUID CRYSTAL PANEL PROTECTIVE COVER AND LIQUID CRYSTAL PANEL PACKAGING COMPONENT

RELATED APPLICATIONS

The present application is a National Phase of International Application Number PCT/CN2018/074206, filed Jan. 25, 2018, and claims the priority of China Application No. 201711421478.1, filed Dec. 25, 2017.

FIELD OF THE DISCLOSURE

The present disclosure relates to a liquid crystal panel packaging field, and more particularly to a liquid crystal panel protective cover and a liquid crystal panel packaging component.

BACKGROUND OF THE DISCLOSURE

In the field of liquid crystal panel packaging, after a plurality of boxes are stacked, a cover is added on the uppermost box, and the box and the cover are finally tied up by a packing tape. As the most commonly used materials for the cover are foam cushioning materials such as Expandable Polyethylene (EPE) and Expanded Polypropylene (EPP), the cover surface is relatively soft, and when the packing tape is tightened, the cover may be greatly damaged. At the same time, the packing tape is easy to slide on the cover, resulting in loose binding. The current method is generally used in the cover to increase the paper angle, play a protective role. On the one hand, there is no fixed connection between the paper corner and the cover, the paper corner may move, and the loose binding will still be caused. On the other hand, an additional paper corner will be provided for each binding, resulting in a waste of manpower.

SUMMARY OF THE DISCLOSURE

The technical problem to be solved by the present disclosure is to overcome the shortcomings of the prior art and to provide a liquid crystal panel protective cover and a liquid crystal panel packaging component which are simple in structure, easy to use and have good protection effect.

In order to achieve the above object, the present disclosure adopts the following technical solutions.

A liquid crystal panel protective cover includes a cover body and a plurality of protectors, wherein a plurality of limiting portions are provided on the edge of the cover body, the plurality of protectors are respectively fixed in the plurality of limiting portions, the protectors are for abutting a packing tape strapped to the cover body.

Optionally, the protectors are U-shaped protectors, shapes of the limiting portions are matched with shapes of the protectors, and the protectors are engaged with the limiting portions.

Optionally, the cover body includes a top wall, a bottom wall opposite to the top wall, and a sidewall connected between the top wall and the bottom wall; each of the limiting portions includes a first groove located in the top wall, a second groove located on the side wall and connected to the first groove, and a third groove located on the bottom wall and connected to the second groove.

Each of the protectors includes a first fixing portion, a second fixing portion formed by bending one end of the first fixing portion, and a third fixing portion formed by bending one end of the second fixing portion.

The first fixing portion abuts the bottom of the first groove, the second fixing portion abuts the bottom of the second groove, and the third fixing portion abuts the bottom of the third groove.

Optionally, each of the protectors further includes a first engaging portion formed by bending the other end of the first fixing portion, the bottom portion of the first groove is partially recessed to form a first recessed portion, the first engaging portion is inserted into the first recessed portion.

Optionally, each of the protectors further includes a second engaging portion formed by bending one end of the third fixing portion, the bottom portion of the third groove is partially recessed to form a second recessed portion, the second engaging portion is inserted into the second recessed portion.

Optionally, the surface at the connection between the first fixing portion and the second fixing portion is a cambered surface.

Optionally, each of the protectors further includes two opposite blocking protrusions, each of the blocking protrusions includes a first blocking portion, and a second blocking portion formed by bending one end of the first blocking portion, two of the first blocking portions are respectively disposed on two sides of the first fixing portion, and two of the second blocking portions are respectively disposed on two sides of the second fixing portion.

Optionally, each of the protectors further includes a plurality of stiffeners, the plurality of stiffeners are spaced apart from each other on the first fixing portion and the second fixing portion, and two ends of each of the stiffeners are vertically connected to two of the blocking protrusions respectively.

Optionally, the protectors are plastic protectors.

The present disclosure also discloses a liquid crystal panel packaging component, which includes a pallet, a box and any one of the above liquid crystal panel protective covers, the box is disposed on the pallet, and the liquid crystal panel protective cover covers the opening of the box.

The present disclosure discloses a liquid crystal panel protective cover and a liquid crystal panel packaging component, by providing a plurality of protectors on the edge of the cover body, the packing tape can be prevented from sliding on the cover body to prevent the packing tape from being damaged by the packing tape. In addition, as the protectors are directly connected with the cover body, there is no need to increase the paper angle during use, which saves manpower.

DETAILED DESCRIPTION OF PREFERRED EMBODIMENTS

In order to make the objectives, technical solutions and advantages of the present disclosure more comprehensible, the present disclosure is further described in detail below with reference to the accompanying drawings and embodiments. It should be understood that the specific embodiments described herein are merely used to explain the present disclosure and are not intended to limit the present disclosure.

Figure 1:
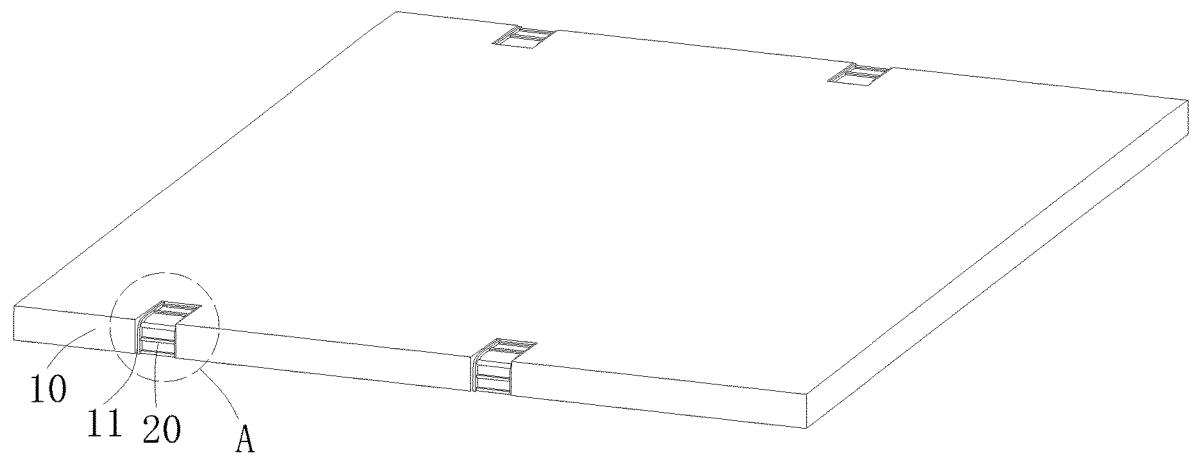
FIG. 1 is a schematic diagram of a liquid crystal panel protective cover according to the embodiment of the present disclosure.
Figure 2:
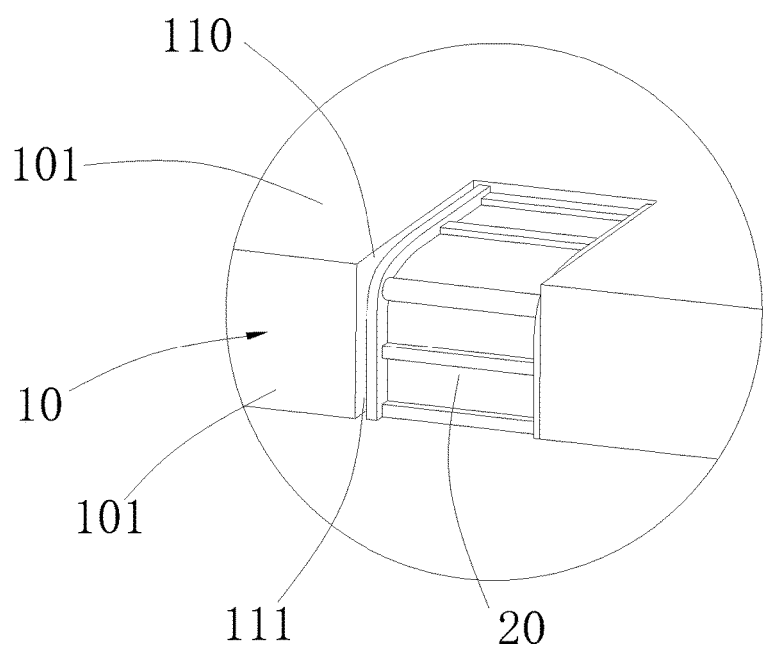
FIG. 2 is a schematic diagram of A in FIG. 1.

As shown in FIG. 1 and FIG. 2, the liquid crystal panel protective cover in this embodiment includes a cover body 10 and a plurality of protectors 20. A plurality of limiting portions 11 are provided on the edge of the cover body 10. the plurality of protectors 20 are respectively fixed in the plurality of limiting portions 11, the protector 20 is used for contacting the packing tape bundled on the cover body 10 to prevent the packing tape from directly pressing the cover body 10 and causing the cover body 10 to be damaged, at the same time, the packing tape can be prevented from slipping on the cover body 10, resulting in loose binding.

As a preferred embodiment, the protector 20 is a U-shaped protector. The shape of the limiting portion 11 is matched with the shape of the protector 20, and the protector is engaged with the limiting portion 11. Further, the material of the cover body 10 has a certain elasticity, for example, expandable polyethylene. The protector 20 and the limiting portion 11 are in direct elastic contact with each other so that the protector 20 and the cover body 10 are tightly connected to prevent the protector 20 from falling off.

Figure 3:
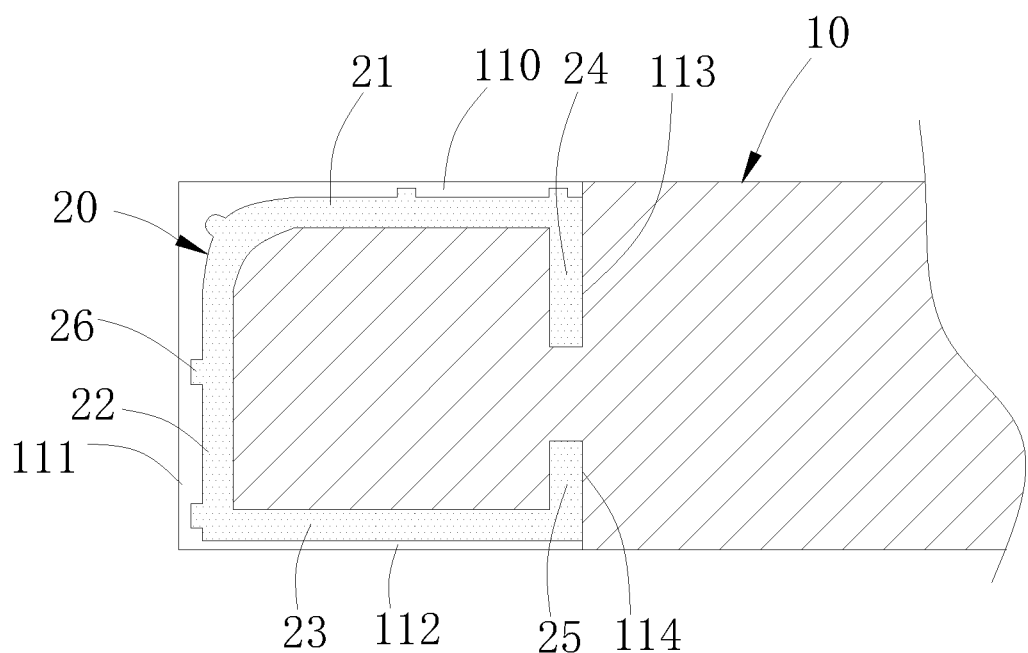
FIG. 3 is a cross-sectional view of a liquid crystal panel protective cover according to the embodiment of the present disclosure.

Specifically, as shown in FIGS. 2 and 3, the cover body 10 is preferably a rectangular cover. The cover body 10 includes a top wall 100, a bottom wall opposite to the top wall 100, and a sidewall 101 connected between the top wall 100 and the bottom wall. The limiting portion 11 includes a first groove 110 in the top wall 100, a second groove 111 in the side wall 101, and a third groove 112 in the bottom wall. The first groove 110 is connects to the second groove 111, and the second groove 111 and the third groove 112 are connected to each other.

Figure 4:
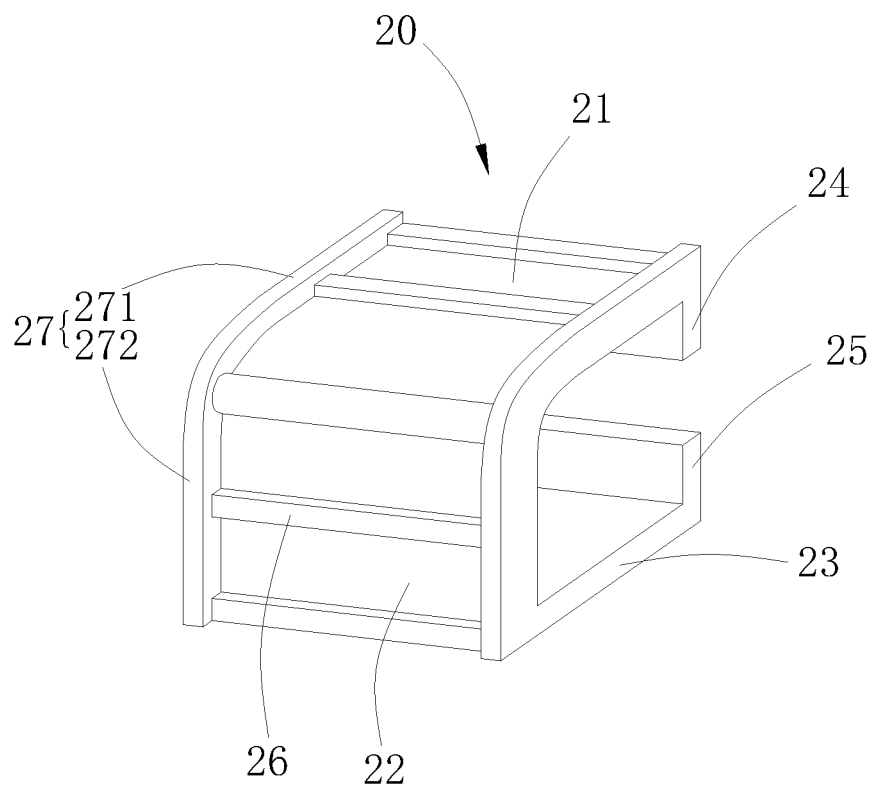
FIG. 4 is a schematic view of a protector according to the embodiment of the present disclosure.

Further, as shown in FIG. 4, the protector 20 includes a first fixing portion 21, a second fixing portion 22 formed by bending one end of the first fixing portion 21, and a third fixing portion 23 formed by bending one end of the second fixing portion 22. The first fixing portion 21 abuts the bottom of the first groove 110, the second fixing portion 22 abuts the bottom of the second groove 111, and the third fixing portion 23 abuts the bottom of the third groove 112. In this way, the protector 20 and the cover body 10 are tightly fixed.

As a preferred embodiment, the protector 20 further includes a first engaging portion 24 bent from the other end of the first fixing portion 21. Correspondingly, a bottom portion of the first groove 110 is partially recessed to form a first recessed portion 113, and the first engaging portion 24 is inserted into the first recessed portion 113.

Further, the protector 20 further includes a second engaging portion 25 formed by bending one end of the third fixing portion 23. Correspondingly, a bottom portion of the third groove 112 is partially recessed to form a second recessed portion 114. The second engaging portion 25 is inserted into the second recessed portion 114. In this way, the limit of the protector 20 can be further realized to prevent the protector 20 from falling off during use.

Specifically, the surface at the connection between the first fixing portion 21 and the second fixing portion 22 is a cambered surface, the first fixing portion 21 and the surface of the second fixing portion 22 are connected flatly, the sharp bend between the first fixing portion 21 and the second fixing portion 22 is avoided and the packing tape abutting on the first fixing portion 21 and the second fixing portion 22 is prevented from being cut off.

As a preferred embodiment, the protector 20 further includes two opposite blocking protrusions 27. Each of the blocking protrusions 27 includes a first blocking portion 271, and a second blocking portion 272 formed by bending one end of the first blocking portion 271. The two first blocking portions 271 are respectively disposed at two sides of the first fixing portion 21 and the two second blocking portions 272 are respectively disposed at two sides of the second fixing portion 22. This prevents the packing tape strapped to the protector 20 from slipping off the first fixing portion 21 and the second fixing portion 22 to prevent the packing tape from affecting the cover.

Further, the protector 20 further includes a plurality of stiffeners 26. The plurality of stiffeners 26 are spaced apart from each other on the first fixing portion 21 and the second fixing portion 22. and the two ends of each stiffeners 26 are vertically connected to the two blocking protrusions 27 respectively. On the one hand, the stiffeners 26 can disperse the stress of the packing tape so that the various parts of the protector 20 are uniformly stressed. On the other hand, the stiffeners 26 enhances the friction between the packing tape and the first fixing portion 21 and the second fixing portion 22, preventing the packing tape from slipping and avoiding the looseness of the packing.

As a preferred embodiment, the number of the limiting portions 11 is eight and the number of the protectors 20 is eight, and two limiting portions and two protectors 20 are respectively disposed on each frame of the cover body 10, and the protectors 20 located on the two opposite sides face one another. In this way, the plurality of packing tapes can be used to bundle the cover from different positions.

In order to reduce the overall weight of the protective cover, the protector 20 is preferably a plastic protector. When the protector 20 is specifically used with the cover body 10, the opening of the protector 20 is slightly opened so that the protector 20 is engaged with the limiting portion 11. The surface of the cover body 10 has a high frictional force and a high compressibility. Therefore, the protector 20 and the cover body 10 are closely matched.

Figure 5:
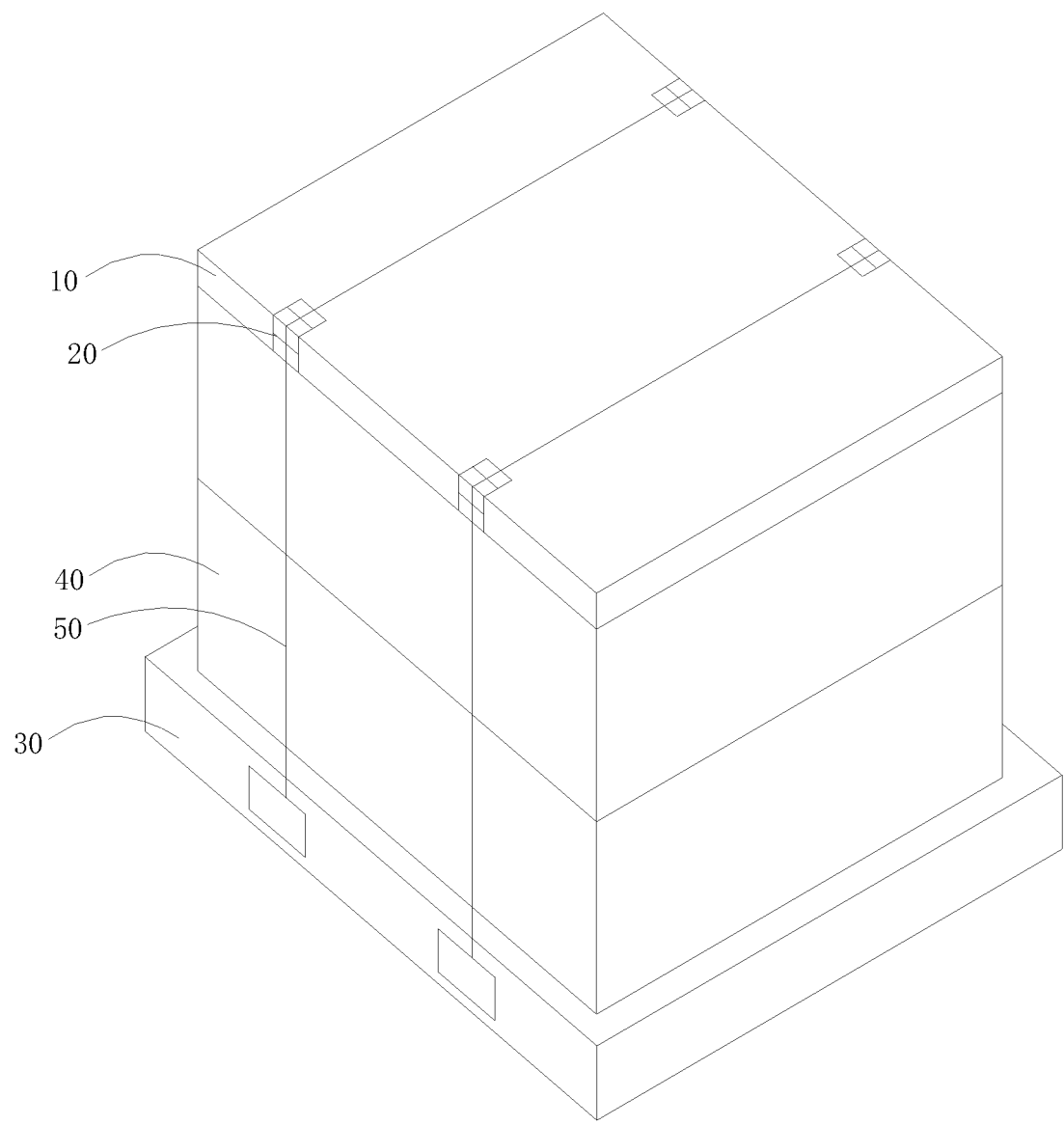
FIG. 5 is a cross-sectional view of a liquid crystal panel package component according to the embodiment of the present disclosure.

Referring to FIG. 5, the embodiment of the present disclosure further provides a liquid crystal panel package component, which includes a pallet 30, a box 40 and the above liquid crystal panel protective cover, the box 40 is used for accommodating the liquid crystal panel, the plurality of boxes 40 with the liquid crystal panel are sequentially stacked on the pallet 30, the liquid crystal panel protective cover located in the upper opening of the box 40, and finally using the packing tape 50 bundle pallet 30, boxes 40 and liquid crystal panel protection cover, wherein the packing tape 50 abuts the protector 20 on each of the cover body 10. This automated packaging production line can be automated across the board, to avoid manually setting a single station paper corner.

The present disclosure discloses a liquid crystal panel protective cover and a liquid crystal panel packaging component. By providing a plurality of protectors on the edge of the cover, the packing tape can be prevented from sliding on the cover to prevent the packing tape from being damaged by the packing tape. In addition, as the protector is directly connected with the cover, there is no need to increase the paper angle during use, which saves manpower.

While specific embodiments of the present disclosure have been described in detail, some embodiments have been shown and described. It will be understood by those skilled in the art that, these embodiments may be modified and improved without departing from the spirit and scope of the present disclosure as defined by the claims and their equiva-

What is claimed is:

1. A liquid crystal panel protective cover, comprising a cover body and a plurality of protectors, wherein a plurality of limiting portions are provided on an edge of the cover, the plurality of protectors are respectively fixed in the plurality of limiting portions, the protectors are configured to abut a packing tape strapped to the cover body;

wherein the protectors are U-shaped protectors, shapes of the limiting portions are matched with shapes of the protectors, and the protectors are engaged with the limiting portions; and wherein the cover body comprises a top wall, a bottom wall opposite to the top wall, and a sidewall connected between the top wall and the bottom wall; each of the limiting portions comprises a first groove located in the top wall, a second groove located on the side wall and connected to the first groove, and a third groove located on the bottom wall and connected to the second groove;

each of the protectors comprises a first fixing portion, a second fixing portion formed by bending one end of the first fixing portion, and a third fixing portion formed by bending one end of the second fixing portion;

the first fixing portion abuts a bottom of the first groove, the second fixing portion abuts a bottom of the second groove, and the third fixing portion abuts a bottom of the third groove.

2. The liquid crystal panel protective cover according to claim 1, wherein each of the protectors further comprises a first engaging portion formed by bending the other end of the first fixing portion, a bottom portion of the first groove is partially recessed to form a first recessed portion, the first engaging portion is inserted into the first recessed portion.

3. The liquid crystal panel protective cover according to claim 2, wherein each of the protectors further comprises a second engaging portion formed by bending one end of the third fixing portion, a bottom portion of the third groove is partially recessed to form a second recessed portion, the second engaging portion is inserted into the second recessed portion.

4. The liquid crystal panel protective cover according to claim 1, wherein a surface at the connection between the first fixing portion and the second fixing portion is a cambered surface.

5. The liquid crystal panel protective cover according to claim 1, wherein each of the protectors further comprises two opposite blocking protrusions, each of the blocking protrusions comprises a first blocking portion, and a second blocking portion formed by bending one end of the first blocking portion, two of the first blocking portions are respectively disposed on two sides of the first fixing portion, and two of the second blocking portions are respectively disposed on two sides of the second fixing portion.

6. The liquid crystal panel protective cover according to claim 5, wherein each of the protectors further comprises a plurality of stiffeners, the plurality of stiffeners are spaced apart from each other on the first fixing portion and the second fixing portion, and two ends of each of the stiffeners are vertically connected to two of the blocking protrusions respectively.

7. The liquid crystal panel protective cover according to claim 1, wherein the protectors are plastic protectors.

8. A liquid crystal packaging component, comprising a pallet, a box, and a liquid crystal panel protective cover, wherein the liquid crystal panel protective cover comprises a cover body and a plurality of protectors, a plurality of limiting portions are provided on an edge of the cover, the plurality of protectors are respectively fixed in the plurality of limiting portions, the protectors are configured to abut a packing tape strapped to the cover body; the box is disposed on the pallet, and the liquid crystal panel protective cover covers an opening of the box;

wherein the protectors are U-shaped protectors, shapes of the limiting portions are matched with shapes of the protectors, and the protectors are engaged with the limiting portions; and wherein the cover body comprises a top wall, a bottom wall opposite to the top wall, and a sidewall connected between the top wall and the bottom wall; each of the limiting portions comprises a first groove located in the top wall, a second groove located on the side wall and connected to the first groove, and a third groove located on the bottom wall and connected to the second groove;

each of the protectors comprises a first fixing portion, a second fixing portion formed by bending one end of the first fixing portion, and a third fixing portion formed by bending one end of the second fixing portion;

the first fixing portion abuts a bottom of the first groove, the second fixing portion abuts a bottom of the second groove, and the third fixing portion abuts a bottom of the third groove.

9. The liquid crystal packaging component according to claim 8, wherein each of the protectors further comprises a first engaging portion formed by bending the other end of the first fixing portion, a bottom portion of the first groove is partially recessed to form a first recessed portion, the first engaging portion is inserted into the first recessed portion.

10. The liquid crystal packaging component according to claim 9, wherein each of the protectors further comprises a second engaging portion formed by bending one end of the third fixing portion, a bottom portion of the third groove is partially recessed to form a second recessed portion, the second engaging portion is inserted into the second recessed portion.

11. The liquid crystal packaging component according to claim 8, wherein a surface at the connection between the first fixing portion and the second fixing portion is a cambered surface.

12. The liquid crystal packaging component according to claim 8, wherein each of the protectors further comprises two opposite blocking protrusions, each of the blocking protrusions comprises a first blocking portion, and a second blocking portion formed by bending one end of the first blocking portion, two of the first blocking portions are respectively disposed on two sides of the first fixing portion, and two of the second blocking portions are respectively disposed on two sides of the second fixing portion.

13. The liquid crystal packaging component according to claim 12, wherein each of the protectors further comprises a plurality of stiffeners, the plurality of stiffeners are spaced apart from each other on the first fixing portion and the second fixing portion, and two ends of each of the stiffeners are vertically connected to two of the blocking protrusions respectively.

14. The liquid crystal packaging component according to claim 8, wherein the protectors are plastic protectors.

* * * * *